United States Patent [19]
Watson

[11] Patent Number: 5,335,780
[45] Date of Patent: Aug. 9, 1994

[54] MULTI-DIRECTION PACKAGE MOVEMENT DEVICE

[76] Inventor: Thomas H. Watson, 2061 Via Taormina, Monterey, Calif. 93940

[21] Appl. No.: 72,553

[22] Filed: Jun. 7, 1993

[51] Int. Cl.⁵ ............................................. B65G 13/02
[52] U.S. Cl. .................................... 198/787; 198/789; 414/528
[58] Field of Search ....................... 197/789, 787, 786; 193/35 MD; 414/528

[56] References Cited

U.S. PATENT DOCUMENTS

| | | | |
|---|---|---|---|
| 4,180,150 | 12/1979 | Moore | 198/787 X |
| 4,541,768 | 9/1985 | Walker et al. | 193/35 MD X |
| 4,787,808 | 11/1988 | Shimoji et al. | 193/35 MD X |
| 4,907,692 | 3/1990 | Sogge | 198/786 X |
| 4,981,209 | 1/1991 | Sogge | 193/35 MD X |
| 5,074,405 | 12/1991 | Magolske et al. | 198/786 |

*Primary Examiner*—Cheryl L. Gastineau

[57] ABSTRACT

A conveying apparatus for moving articles such as pallets in a plurality of directions. The article is supported, at least partially, by a plurality of rollers mounted along parallel chains. The rollers are free to rotate, and are mounted to the chains with their axis of rotation approximately 45 degrees from the longitudinal axis of the chain. By selecting the chain to be driven, and its direction, the article can be moved longitudinally, laterally, or at approximately 45 degree angles to the longitudinal axis of the chains. The article can also be rotated clockwise or counter-clockwise in the area of the conveying system where sections of longitudinal chain terminate, and the next section of longitudinal chain starts, due to the perpendicular axis of rotation of rollers in adjacent chains.

3 Claims, 8 Drawing Sheets

MULTI-DIRECTION PACKAGE MOVEMENT DEVICE

FIELD OF THE INVENTION

The present invention generally relates to package conveyors which may be useable as part of a mobile aircraft loader. More specifically, the present invention relates to a multi-direction conveyor which is controlled to deliver packages along a first linear path, and along paths which have directional components which are perpendicular to the first linear path. The conveyor is also controllable to orient (rotate) packages while maintaining the packages in one location relative to the conveyor.

BACKGROUND OF THE INVENTION

Various configurations for conveyors are shown in the prior art such as those disclosed in U.S. Pat. No. 5,145,049, issued to McClurkin on Sep. 8, 1992; U.S. Pat. No. 4,907,692, issued to Scogge on Mar. 13, 1990; and U.S. Pat. No. 2,172,926, issued to Wylie on Sep. 12, 1939. These carriers have various mechanisms for moving and rotating packages. More specifically, U.S. Pat. No. 5,145,049 includes three zones for centering, rotating and organizing boxes. The second zone includes a plurality of rotation rollers positioned in rows between parallel rollers. The rotation rollers are fixed at angles which urge a box to both rotate and continue to advance along a direction of movement. The rotation rollers are raised and lowered into and out of contact with the box so the box is properly rotated.

U.S. Pat. No. 4,907,692 discloses an apparatus for controlling the movement of flat bottom articles in a plurality of directions. The articles are supported on a plurality of clusters of helical, freely rotatable rollers mounted on a plurality of shafts. Each shaft lies in one of a plurality of zones, and are selectively driven in clockwise and counterclockwise directions. Selective control of the shafts enables the apparatus to move an article parallel to the longitudinal axis of the platform in two selected directions, perpendicular to the longitudinal axis in two selected directions, diagonal to the axis in four selected directions, and either clockwise or counterclockwise about an axis normal to the flat bottom of the article.

U.S. Pat. No. 2,172,926 discloses a pallet conveyor including a belt having two parallel conveyor chains connected by a plurality of cross-members which are parallel to the chains. The members rotatably support a plurality of rollers or wheels at rotational axes which are parallel to the chains. The wheels facilitate movement of articles relative to the belt in directions perpendicular to the direction of movement of the belt and restrict movement of articles relative to the belt along the direction of movement of the belt.

U.S. Pat. No. 2,554,038, issued on May 22, 1951 to Lemmon, and U.S. Pat. No. 1,883,005, issued on Oct. 18, 1932 to Shafer, disclose conveyor chains having rollers which form the conveyance surface of the chains. The rollers are supported on the chains so that the longitudinal axes of the rollers are parallel with the longitudinal axes of the associated chains. This configuration allows the chains to be used in conveyors which function in generally the same manner as the conveyor of U.S. Pat. No. 2,172,926.

One drawback with the above-referenced conveyors is their complexity. Another drawback with conveyors using the above-referenced chain configurations is their inability to move articles in a plurality of directions and inability to rotate articles. Accordingly, it would be desirable to provide a chain driven conveyor system which is capable of providing multi-direction movement and rotation of articles.

SUMMARY OF THE INVENTION

The invention relates to material handling equipment and particular to improvement in the ability to move articles in a plurality of directions using a chain drive system.

Previous chain systems are capable of moving articles only in the longitudinal direction of the chain. Provisions have been made to move cargo laterally across the chain by adding freely rotating rollers attached to the chain with their axis of rotation aligned with the longitudinal axis of the chain. While these rollers allow for the movement of cargo in the lateral direction, they do not drive the cargo in that direction. Therefore this arrangement requires a separate lateral drive system. One such arrangement would use a series of chains arranged both longitudinally and laterally. The disadvantages of such a system, other than its complexity and cost, are that the lateral and longitudinal chains could not cross. This would result in a multitude of short sections of chain in one of the directions.

A second disadvantage of such a system is that when cargo moves in a longitudinal direction, all of the rollers on the lateral chains must rotate to allow the longitudinal motion. In a material handling system, it is normal for cargo to move primarily in one direction. With the present invention, the chains are mounted aligned with the primary direction of cargo movement. The cargo moves in the primary direction when the chains are driven in that direction. The cargo moves at the same speed as the chain. Also in the present invention, the rollers attached to the chain have their axis of rotation at approximately 45 degrees to the longitudinal axis of the chains. These rollers do not rotate during movement of the cargo in this primary direction. Because the rollers do not rotate when cargo moves in this primary direction, wear does not occur in the bearings for these rollers. Also, because the rollers do not rotate during movement in the primary direction, the cargo maintains its alignment. If the rollers rotated, then the cargo might skew caused by uneven cargo load distribution, and resultant uneven rotation the freely spinning rollers.

Another limitation of a system of longitudinal chain with lateral freely rotating rollers, is that it can not be used for cargo rotation. The axis of the rollers are not aligned to drive the cargo about a rotational center. With the present invention, the rollers are positioned so that they drive the rotation of the cargo because the 45 degree angle of their rotational axis is perpendicular to a tangent drawn from the centerline of cargo rotation.

Still another limitation of the use of longitudinal chains mounting lateral rollers is its inability to move cargo diagonally. With the present invention, cargo can be moved diagonally because of the approximate 45 degree mounting of the freely rotating rollers. To move the cargo diagonally, only those chains whose rollers are aligned with the desired direction of cargo movement are driven. The rollers of adjacent chains have their axis of rotation perpendicular to the movement of the cargo. Holding these chains stationary allows the freely rotating rollers to provide for the unhindered diagonal movement of the cargo.

A second type of material handling system presently in use uses a chain to drive the cargo in the primary direction. Drive rollers move the cargo in other directions, and can be used to rotate the load. However, the chain inhibits the lateral movement and rotation of the cargo, and the drive rollers inhibit the longitudinal movement of the cargo. It is therefore necessary for the drive rollers to be higher than the chain during lateral movement and rotation, and for the chain to be higher than the drive rollers during longitudinal movement. This type of system must elevate or retract the chain or the rollers depending upon the desired direction of cargo movement. The mechanism for raising and lowering the rollers or chain are costly, heavy, and require considerable maintenance. Also, the support structure is excessively heavy because of redundant load paths. Structure must be provided to support the load when it is resting upon the chain. Additional support structure must be provided for the case when the load is supported by the drive rollers.

The present invention need not raise or lower any of the cargo supporting elements or structure to provide for the movement of cargo in any direction. Because the load path does not change depending upon the direction of cargo movement, excessive structure associated with redundant load paths is avoided.

A third type of cargo drive system utilizes a plurality of clusters of helical, freely rotatable rollers mounted on a plurality of shafts. This system provides for motion in all directions, and redundant load paths are avoided. However this system is complex, expensive, and requires excessive maintenance. In addition, the limited contact between the roller and the cargo results in high roller contact loading, and results in skewing of the cargo during translation movement. The peripheral rollers of this invention form a roller assembly. These peripheral rollers must thus be barrel shaped to formed the circumference of the roller assembly. Therefore only point contact occurs between the peripheral barrel shaped roller and the cargo. This point contact results in high roller contact pressure, and the tendency for the cargo to rotate about this point contact during cargo movement. The present invention uses cylindrical rollers. Thus line contact occurs between the cargo and the roller. This line contact prevents skewing of the cargo caused by rotation of the cargo about a point loading.

The present invention requires no rotation of the rollers during longitudinal, primary direction, movement of the cargo. This is not true of this third type of cargo drive system. The peripheral barrel shaped rollers when mounted at an angle as described in U.S. Pat. No. 4,907,692, follow a helical contact motion with the cargo. The rotation of the peripheral rollers result in bearing wear, and the tendency of the cargo to partially rotate as well as translate during primary movement.

The present invention uses chain instead of roller cluster assemblies and support shaft assemblies. One type of chain which can be used with the present invention is carrier roller type conveyor chain. The carrier rollers are part of the chain, and provide for the rolling support between the chain and its supporting structure. This is a standard type of chain and readily available. This chain is also inexpensive because of the automated nature in which it is constructed. The supporting structure for this chain is simple structural steel elements upon which the carrier rollers roll. When the carrier roller bearings become worn, they are easily, quickly, and inexpensively replaced by disconnecting and replacing the entire chain assembly.

In comparison, the repair and maintenance of the system described in U.S. Pat. No. 4,907,692 is much more complex and costly. First the cross support shaft assemblies must be disassembled and removed. Then the specialty roller cluster assemblies must be disassembled, and the bearings replaced. The entire system must then be reassembled. Replacement parts are expensive because they are specialty components not utilizing automated manufacturing methods.

In summary, the present invention utilizes standard chain elements to which angled rollers are attached, to achieve the movement of cargo only previously achieved using complex roller assemblies or combinations of drive rollers and chains. Product complexity, cost, and weight are reduced by use of the present invention. In addition, replacement of the moving elements subject to wear can be accomplished in a fraction of the time required for previous arrangements.

DETAILED DESCRIPTION OF THE PREFERRED EMBODIMENT

Figure 1:
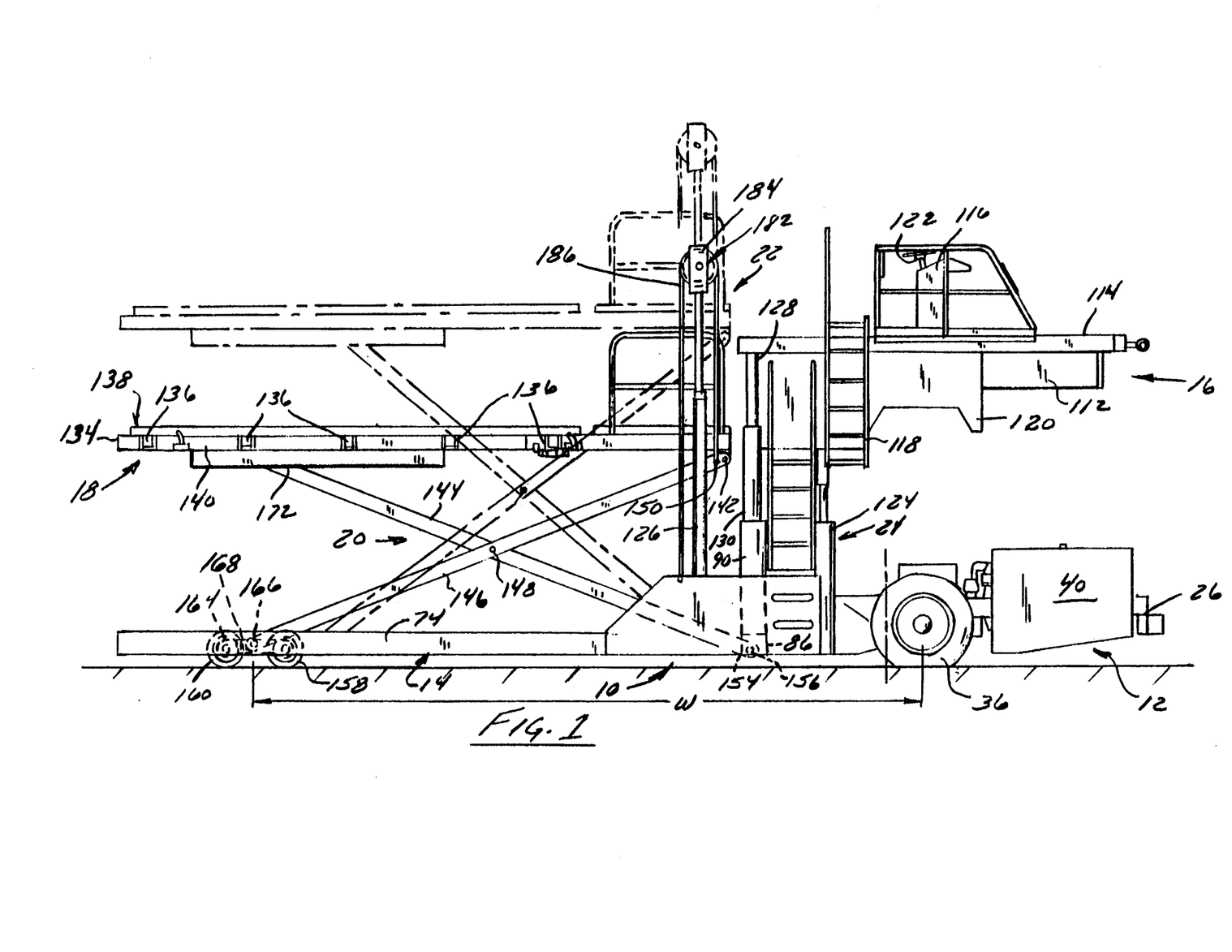
FIG. 1 is a side view of a mobile aircraft loader.

Referring to FIG. 1, a mobile aircraft loader 10 generally includes a tractor 12, a rear frame 14, a forward elevating platform 16, a rear elevating platform 18, a scissors lift assembly 20, a rear lift mast assembly 22, and a forward mast and lift cylinder assembly 24. Tractor 12 is pivotally coupled to rear frame 14 to provide steering for loader 10. Platforms 16 and 18 are both supported by rear frame 14. Scissors lift assembly 20 and rear lift mast assembly 22 cooperate to raise and lower platform 18.

While platform 18 is raised and lowered, scissors lift assembly 20 maintains platform 18 parallel to frame 14. Forward elevating platform 16 may be raised and lowered independently of platform 18, and is raised and lowered by forward mast and lift cylinder assembly 24. By supporting both platforms 16 and 18 at rear frame 14, these platforms may be maintained in alignment regardless of the orientation of tractor 12 relative to rear frame 14. Since loader 10 is of the type for transferring cargo to a cargo transporter such as an aircraft, and cargo is transferred between platforms 16 and 18 during loading and unloading, platforms 16 and 18 must be kept aligned at all times, including maneuvering loader 10 relative to the aircraft.

Figure 2:
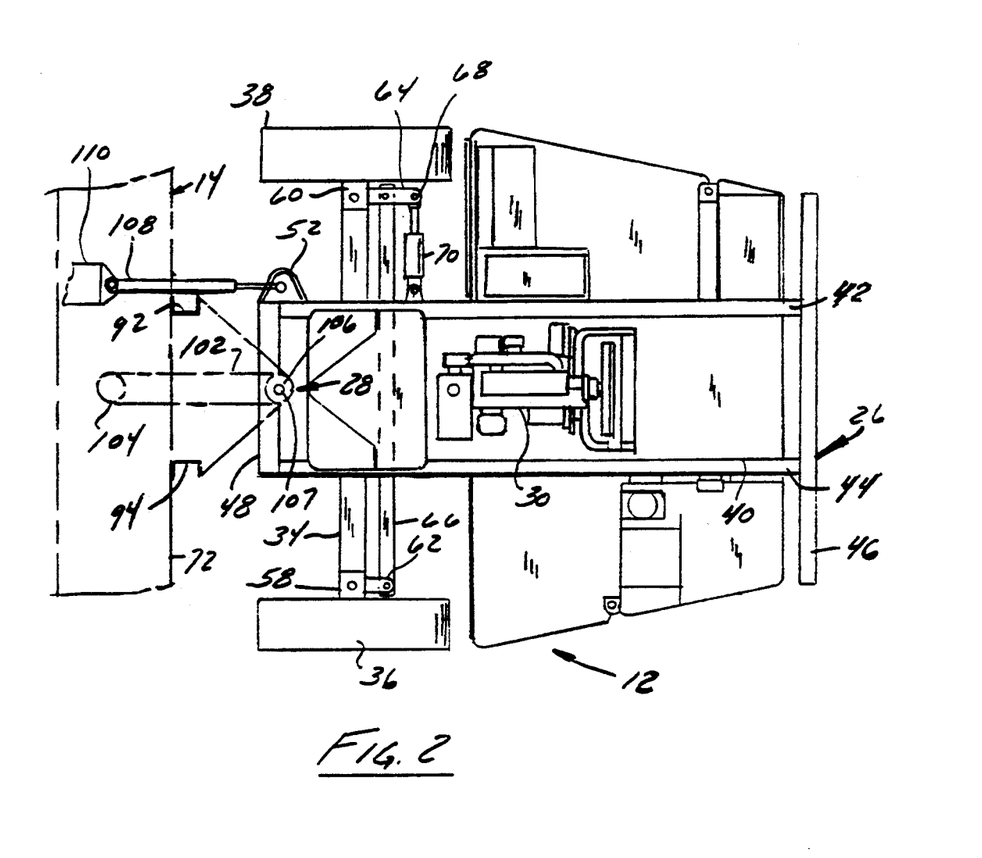
FIG. 2 is a top view of a tractor portion of the loader.
Figure 3:
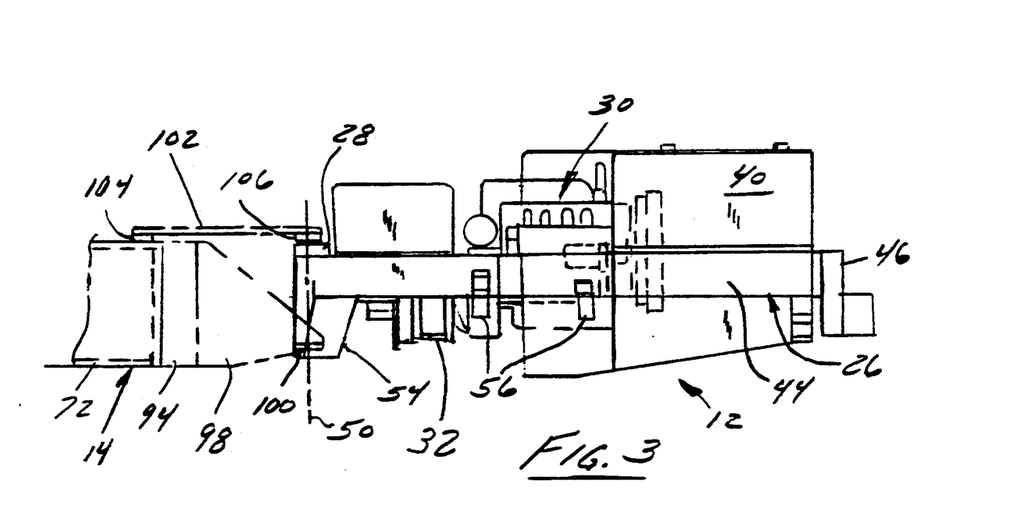
FIG. 3 is a side view of the tractor portion of the loader.

Referring to FIGS. 2 and 3, tractor 12 includes a frame 26, a pivot bearing assembly 28, an engine 30, a transmission 32, a steerable drive axle 34, and a pair of wheels 36 and 38 appropriately connected to drive axle 34. Tractor 12 also generally includes a shroud or supporting housing 40 which encloses and supports auxiliary equipment for engine 30 and transmission 32, such as fuel tanks, oil reservoirs, braking system components, radiators, batteries, electrical systems and other fluid holding tanks.

Tractor frame 26 is generally rectangular shaped and includes two parallel frame beams 42 and 44 welded between a bumper beam 46 and a pivot beam 48. Pivot bearing assembly 28 is welded to pivot beam 48 such that the rotational axis 50, within assembly 28, is perpendicular to the longitudinal axes of beams 42 and 44, and is in the center of pivot beam 48. Frame 26 also includes a steering pivot 52 which is welded to beam 44. Appropriate struts 54 may be welded between beams 42 and pivot bearing assembly 28 to provide appropriate rigidity between frame 26 and assembly 28.

Engine 30 may be either a gasoline or diesel engine, and is supported at beams 42 and 44 by engine mounts 56. Depending upon the application and loader 10 size, an appropriate electric motor and battery arrangement may be used in place of the engine. Transmission 32 is also fastened to beams 42 and 44 and is appropriately coupled to engine 30 and drive axle 34 such that the rotational motion provided by engine 30 may be appropriately applied to wheels 36 and 38.

Steerable drive axles 34 are mounted directly to beams 42 and 44, but may be provided with a suspension assembly therebetween. Axle 34 includes a pair of wheel ends 58 and 60 which allow wheels 36 and 38 to pivot at axes which are generally parallel to rotational axis 50. Each wheel end 58, 60 is provided with a steering arm 62 and 64 which are connected by a tie rod 66. Steering arm 64 also includes a hydraulic pivot end 68 which is coupled to a hydraulic steering cylinder 70 having one end pivotally connected to beam 42. Accordingly, upon appropriate actuation of hydraulic steering cylinder 70, wheels 36 and 38 may be pivoted relative to frame 26 to allow an operator to steer loader 10 independently of articulation or simultaneously with articulation to provide additional maneuverability. By way of modification, the wheel ends of axle 34 may include additional reduction such as a planetary gear drive.

Figure 4:
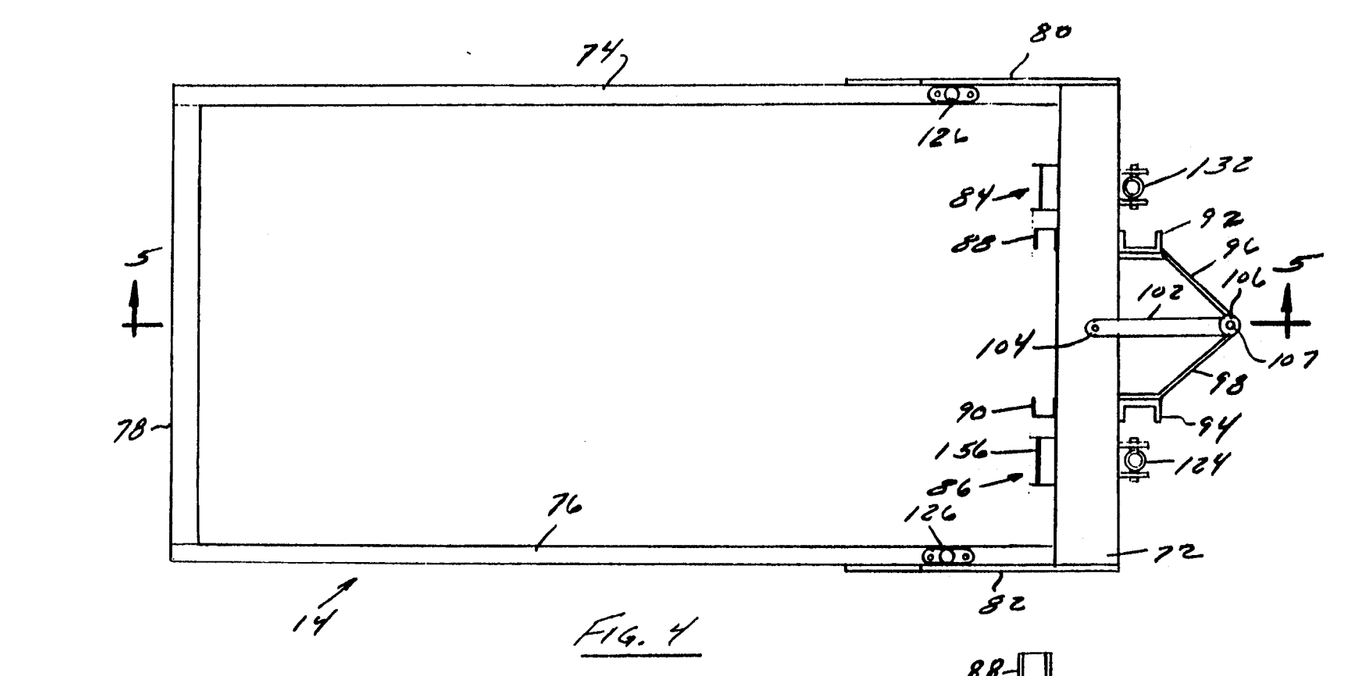
FIG. 4 is a top view of a frame portion of the loader.
Figure 5:
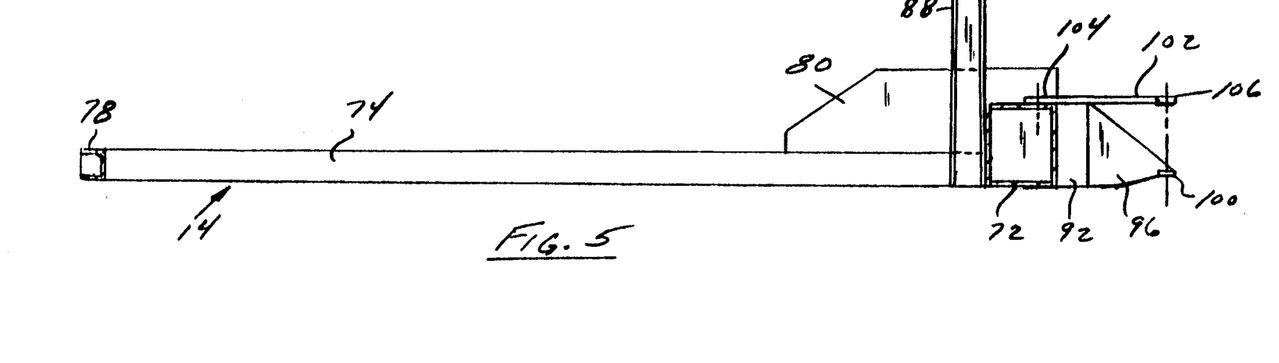
FIG. 5 is a cross-sectioned side view of a frame portion of the loader taken along line 5—5 in FIG. 4.

Rear frame 14 generally provides a structure for supporting forward and rear elevating platforms 16 and 18. Referring to FIGS. 4 and 5, rear frame 14 includes a rectangular tube member 72 which is the main structural member of frame 14. Frame 14 also includes two C-channels 74 and 76. C-channels 74 and 76 are held in parallel alignment by an end frame beam 78 and member 72, where channels 74 and 76 are welded therebetween. To increase the strength and rigidity of the joint between channels 74 and 76, and member 72, side gusset plates 80 and 82 are welded to the ends of tube member 72 and along a portion of the sides of channels 74 and 76. Frame 14 also includes a pair of pivot mounts 84 and 86 welded to member 72 for engagement with scissor lift assembly 20 (discussed in detail below). Also welded to tube member 72 are a pair of mast channels 88 and 90 which form a portion of assembly 24 which supports forward elevating platform 16. At the front of tube 72, a pair of channels 92 and 94 are welded at equal distances from the center of member 72. Channels 92 and 94 are also welded to a pair of bearing support plates 96 and 98, which support a lower spherically supported bearing 100. An upper bearing support arm 102 is connected to the center of member 72 by a spherically supported bearing 104, and supports an upper spherically supported bearing 106 at the opposite end.

Referring back to FIGS. 2 and 3, bearings 100, 104 and 106, along with the structure which supports these bearings relative to rectangular tube member 72, allows tractor 12 to articulate relative to rear frame 14 and also rotate (twist) relative to rear frame 14. More specifically, a pivot pin 107 passes through bearings 100 and 106, and pivot bearing assembly 28. Articulation of tractor 12 relative to frame 14 is provided by an articulation hydraulic cylinder 108 which is pivotally connected to steering pivot 52 and a steering pivot 110 welded to tube 72. When hydraulic cylinder 108 is extended, tractor 12 rotates clockwise relative to frame 14, and when withdrawn, tractor 12 rotates counterclockwise relative to frame 14.

Figures 6, 7:
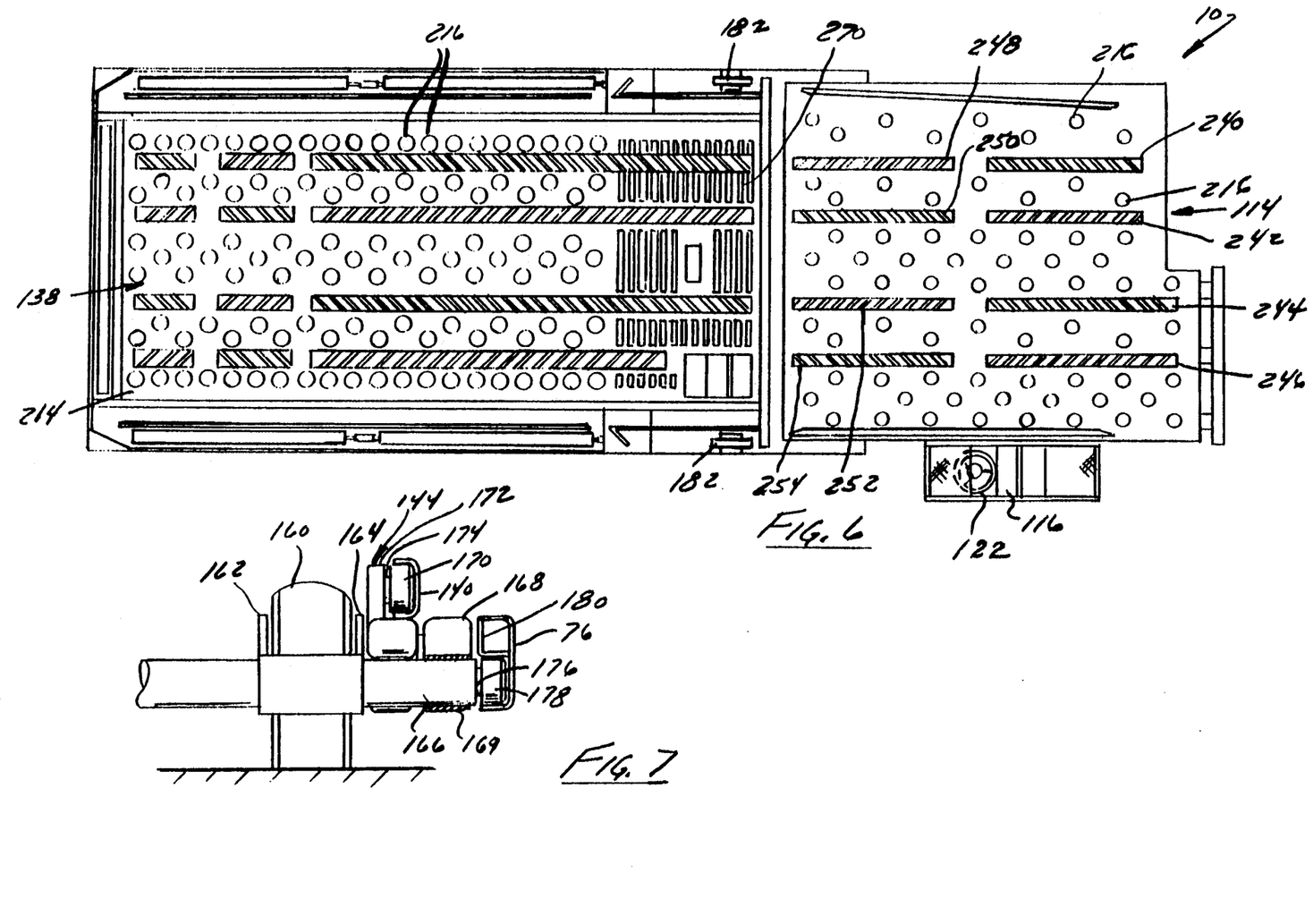
FIG. 6 is a top view of the cargo carrier of the loader.
FIG. 7 is an end view of a wheel and scissors assembly of the loader.

Referring to FIGS. 1 and 6, forward elevating platform 16 includes a frame 112 which supports a cargo conveyor 114, a control console 116, a ladder 118, and wheel fenders 120. Control console 116 includes a steering wheel 122, instrumentation, and other control levers, switches and pedals required to operate loader 10. Steering wheel 122 and the other operator controls appropriately communicate, via electronics, hydraulics or air, with appropriate control valves (not shown) and switches at tractor 12 for controlling the various steering and articulation cylinders 70 and 108 and the hydraulic lift cylinders 124 and 126, which raise and lower platforms 16 and 18, respectively.

Frame 112 is welded to a top mast portion 128, which is slidably supported at mast channel 90 by an intermediate mast channel 130. The combination of channels 90, 128 and 130 permit platform 16 to translate relative to frame 14 between a first position adjacent to tractor 12 and a second position located at a distance (e.g., 10 to 15 feet) upward from tractor 12 while remaining horizontal. The telescoping mast formed by channels 90, 128 and 130 may be modified to include rollers within the channels to reduce friction within the mast during raising and lowering. This type of arrangement is of the type that is typically used in the mast of a forklift. FIG. 1 is a side view of loader 10 and thus does not show the upper and intermediate channels associated with mast channel 88. Hydraulic cylinder 124 and a parallel cylinder 132 (see FIG. 4) are fastened at their lower end to tube 72 and at their upper end to the bottom of platform 16. By controlling the flow of hydraulic fluid to cylinders 124 and 132 with appropriate valving, an operator at console 116 may selectively raise and lower platform 16.

Rear elevating platform 18 includes a pair of side frame members 134 held in a parallel relationship by C-channel cross members 136. Platform 18 also includes a cargo conveyor 138 supported on the top thereof, and a pair of guide channels 140, each welded to the bottom of one of frame members 134. Each member 134 includes a scissor pivot 142 mounted at its front end. Scissor lift assembly 20 includes a pair of scissors each having a pair of scissor members 144 and 146 having a rectangular cross-section. Scissor members 144 and 146 are attached by a pivot pin and bearing arrangement 148, where a pivoting end 150 of member 146 is attached to platform 18 at pivot 142, and pivot end 154 of member 144 is pivotally attached at pivot pin 156 of pivot mount 86. Similarly, members 144 and 146 of the second scissors are attached to platform 18 and pivot mount 84.

Each scissor member 146 is pivotally attached to a pair of rear wheels 158 and 160. The rear wheels are supported upon bearings and supported relative to each other by a pair of side plates 162 and 164 which are welded to an axle 166. Member 146 includes a bearing 169 at its lower end 168 which pivotally attaches lower end 168 to axle 166.

Referring to FIG. 7, a roller 170 which is rotatably attached to the upper end 172 of member 144 by a shaft 174 rides within guide channel 140 when platform 18 is raised and lowered. Each end of axle 166 includes a shaft 176 which rotatably supports a roller 178 which rolls within the channel formed by the associated C-channel 74 or 76 of frame 14. To provide additional strength to channels 74 and 76, and a more constrained path of travel for roller 178, a member 180 with an L-shaped cross-section is welded within channels 74 and 76. When platform 18 is raised and lowered, rollers 178 travel within channels 74 and 76.

The force for raising and lowering platform 18 is provided by a hydraulic pulley chain lift 182 of the type which is typically used in a forklift. This lift includes the hydraulic cylinder 126 fastened to members 74 and 76 as shown in FIG. 4, and includes pulley arrangements 184 each located at the top of one of cylinders 126. A chain or cable 186 is fastened at one end to frame 14 and at the other end to member 146 substantially at pivot 142. Chain or cable 186 passes over pulley arrangement 184 to allow platform 18 to raise when cylinder 126 is extended and lower when cylinder 126 is retracted.

In operation, the scissors of assembly 20 and their relationship to frame 14 and platform 18 as described above, shortens the wheel base (W in FIG. 1) when platform 18 is raised. This shortened wheel base substantially increases the maneuverability of loader 10 so that an operator can raise platform 18 to increase maneuverability (i.e. shorten the wheel base to decrease the turning radius). Additionally, assembly 20 allows the scissor loads at ends 168 to be transmitted directly to ground via wheels 158 and 160 to provide more direct and stable support for platform 18.

By way of modification, wheels 158 and 160 could be replaced with a single wheel located on axle 166. However, the use of two wheels 158 and 160 allow the diameter of the wheels to be reduced while maintaining the carrying capacity of the wheels. By reducing the wheel diameter, platform 18 can be lowered closer to frame 14 and the ground to expedite loading onto platform 18.

Members 76 and 78 of frame 14 provide a structure which guides and stabilizes the operation of scissors 20. Members 74, 76 and 78 also serve to act as a barrier to prevent vehicles, trailers, personnel, etc. from moving under platform 18 when it is raised. However, depending upon the application, scissors assembly 20 could be appropriately reinforced to eliminate the use of members 74, 76 and 78.

Referring generally to FIGS. 8-16, cargo conveyor 138 will be described in detail. Many of the structural and operational details of conveyor 138 are equally applicable to cargo conveyor 114. In the present embodiment, conveyor 138 includes 12 conveyor chains 188, 190, 192, 194, 196, 198, 200, 202, 204, 206, 208 and 210. Each chain includes a plurality of package or cargo supporting rollers 212. Conveyor 138 includes a deck 214 which includes a plurality of multi-directional spherical rollers 216 supported by deck 214 which extends between the members of frame 215 such that the top peripheral surfaces 218 of rollers 216 and the top peripheral surfaces 220 of rollers 212 generally lie in the same plane. More specifically, peripheral surfaces 218 and 220 are located such that rollers 216 support the weight of a package 222 while allowing package 222 to move in any direction. The weight of package 222 is also supported upon rollers 212 such that when rollers 212 contact package 222, motion from the associated conveyor chain may be transmitted to package 222 to move package 222 along rollers 216. By way of example, rollers 216 may each include a threaded rod portion 224 which may be engaged with deck 214 to maintain rollers 216 in position.

Referring to FIG. 6, a plurality of cylindrical rollers 270 may be provided at the interface between conveyor 138 and 114 in addition to spherical rollers 216 to provide additional support and guidance for packages 222 being transferred from conveyor 138 to conveyor 114.

Figure 10:
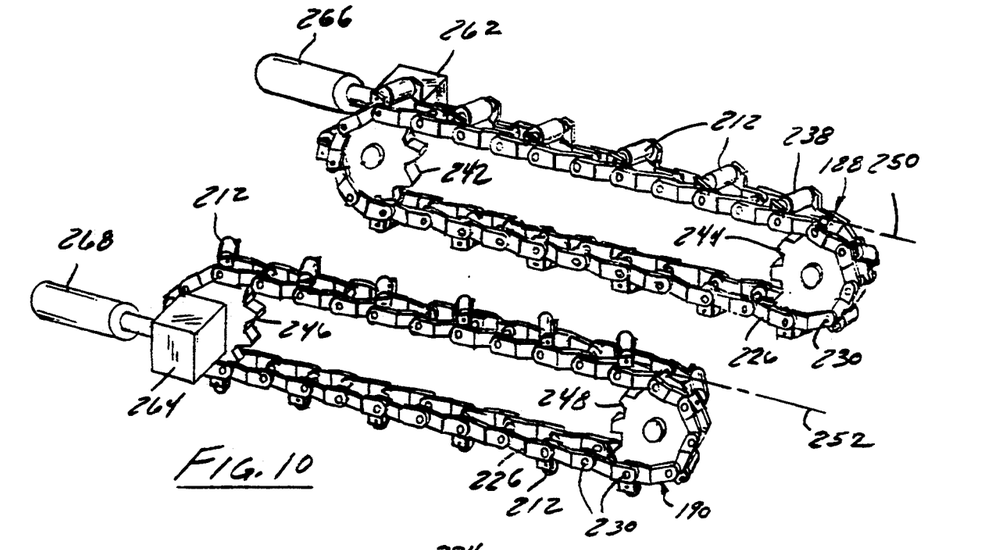
FIG. 10 is a perspective view of a pair of cargo carrying chains and associated support and drive assemblies.
Figure 11:
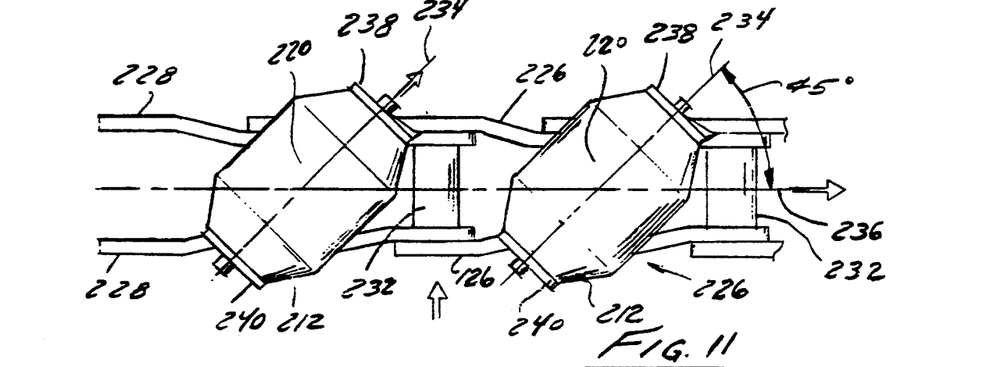
FIG. 11 is a top view of a portion of cargo carrying chain.

Referring to FIGS. 10-11, each conveyor chain 188-210 has a similar construction. Accordingly, all of the chains will be described in reference to conveyor chains 188 and 190. Each conveyor chain 188 and 190 includes a plurality of inclined cargo supporting rollers 212. With the exception of inclined rollers 212, chains 188 and 190 have a structure which is similar to conventional conveyor chains. More specifically, each chain 188 and 190 includes a plurality of links 226 each formed from a pair of side plates 228, and a pair of openings configured to accept a link pin 230 which joins adjacent links 226. Depending upon the application, chains 188 and 190 may also include rollers 232 which rest between side plates 228 and are disposed about link pins 230.

Rollers 212 are inclined in that their longitudinal axes 234 are neither parallel nor perpendicular to the longitudinal axis 236 of the associated conveyor chain 188 or 190. By way of specific example, the preferred embodiment of the angle of inclination between longitudinal axes 234 and 236 is 45°, where the angle of inclination for chain 188 is positive and for associated chain 190 is negative. Rollers 212 are supported relative to chains 188 and 190 by a roller support which includes first and second support members 238 and 240. In the present embodiment, members 238 and 240 are formed directly from a portion of side plates 228. However, members 238 and 240 may be formed and joined to chains 188 and 190 in any manner appropriate to support rollers 212 relative to chains 188 and 190.

Figure 12:
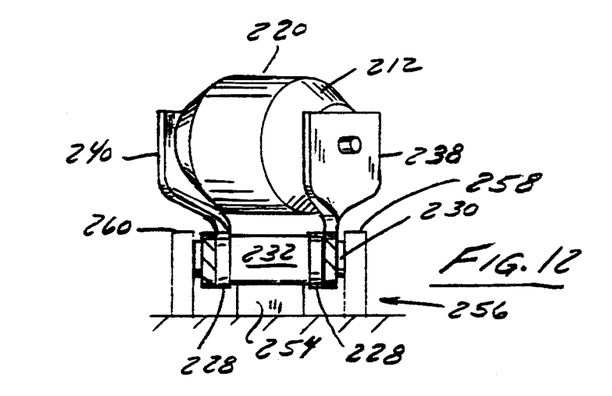
FIG. 12 is an end view of cargo carrying chain.

Chains 188 and 190 are disposed in a side-by-side, parallel relationship about chain guides which may take a number of forms. In the embodiment shown in FIG. 10, the chain guides include a pair of sprockets 242 and 244, and 246 and 248 which engage chains 188 and 190, respectively. Sprockets 242-248 are rotatably supported upon appropriate shaft and bearing structures so that chains 188 and 190 may be tightened and provided with straight paths of travel 250 and 252, respectively. By way of modification, the chain guides may be modified by replacing sprockets 244 and 248 with non-toothed wheels. In addition, a combination of chain slides 254 and/or 256 may be used to guide chains 188 and 190. Referring to FIG. 12, chain slide 254 is configured as a rail which is positioned between plates 228 and supports the associated conveyor chain at rollers 232. Chain slide 256 is configured to prevent the associated conveyor chain from moving laterally along its associated path of travel by providing guide rails 258 and 260 which slidably engage link pins 230 of the associated conveyor chain. By way of example, chain slides 254 and 256 may be fabricated from an appropriate plastic or metal bearing material.

Sprockets 242 and 246 are each coupled to drive trains 262 and 264, respectively. Drive trains 262 and 264 are mechanically coupled to motors 266 and 268, respectively, and provide bearing support for sprockets 242 and 246 and the proper reduction gear and/or chain between motors 266 and 268 and the respective sprockets 242 and 246. Motors 266 and 268 may be electric or hydraulic motors which are powered from a generator, battery or hydraulic pump associated with the motor 30 of tractor 12. By way of modification, motors 266 and 268 may be replaced with a transmission which is capable of selectively providing power to drive trains 262 and 264. For example, such a transmission may include a differential drive coupled to motor 30.

Figure 13:
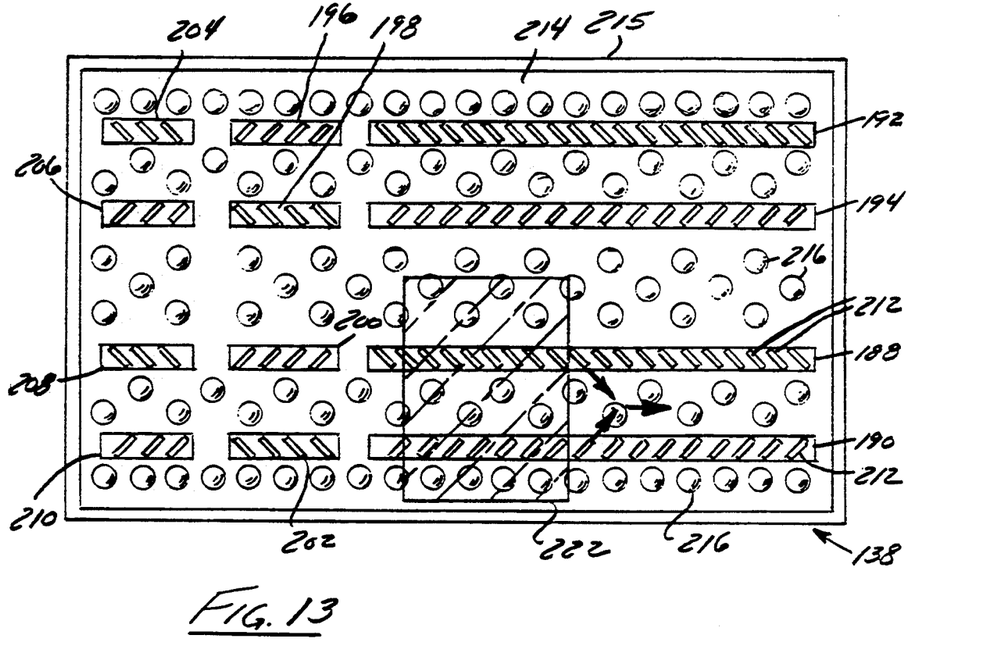
FIG. 13 is a top view of the cargo carrier including a package and representation of a first direction of movement for the package.
Figure 14:
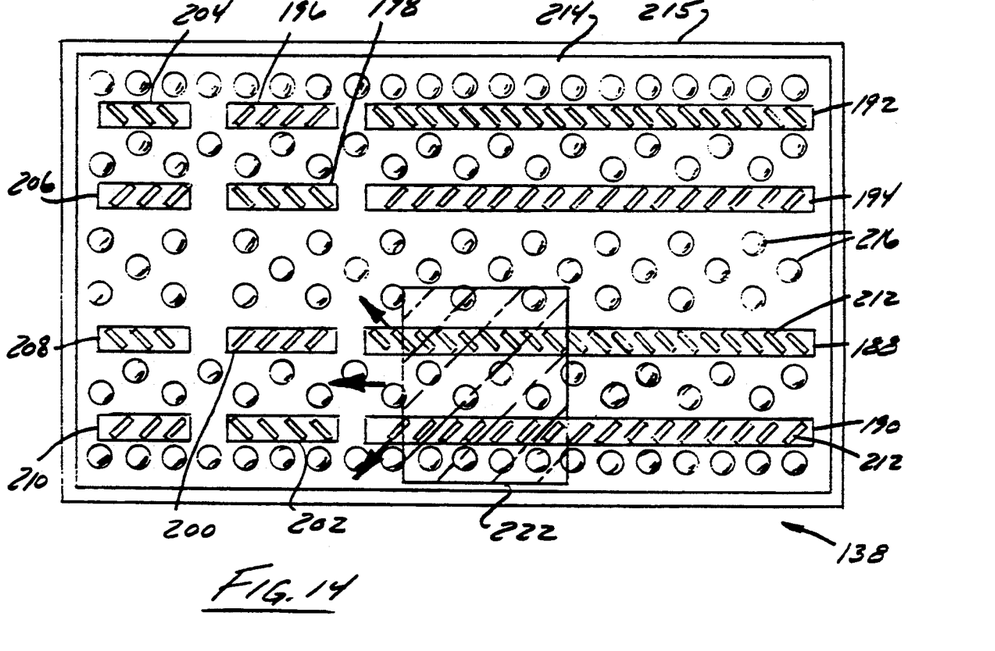
FIG. 14 is a top view of the cargo carrier including a package and representation of a second direction of movement for the package.
Figure 15:
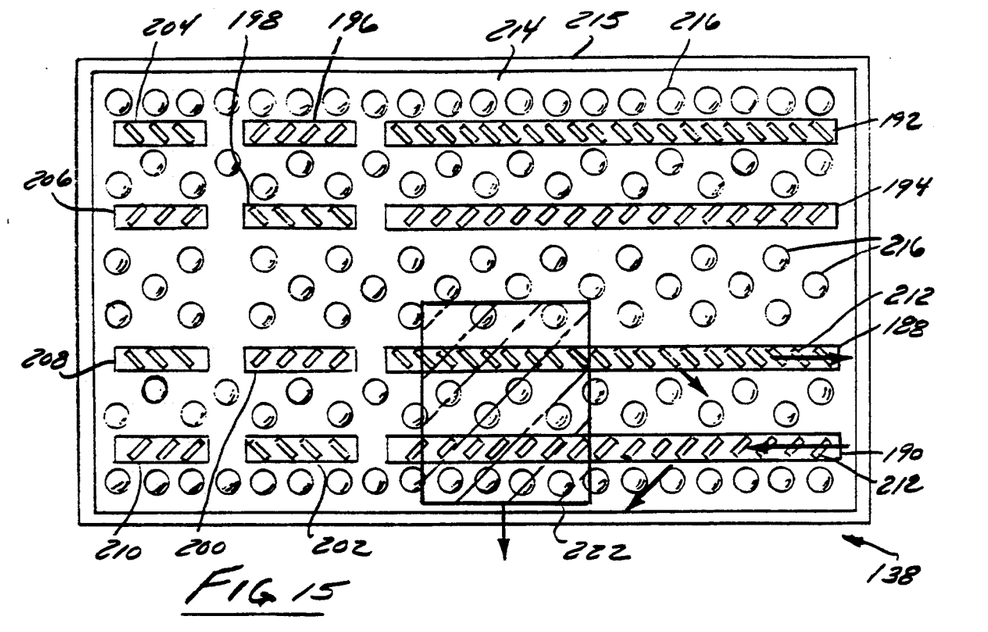
FIG. 15 is a top view of the cargo carrier including a package and representation of a third direction of movement for the package.

The operation and cooperation of conveyor chains 118-212 which conveys packages along conveyor 138 will now be described. Referring to FIG. 13, package 222 is resting upon inclined package support rollers 212 of chains 188 and 190 and spherical rollers 216. To move package 222 to the right, as shown in FIG. 13, chains 188 and 190 are driven by their associated chain drives such that rollers 212 also move to the right at the same velocity. To move package 222 to the left, as shown in FIG. 14, chains 188 and 190 are driven such that rollers 212 also move to the right at the same velocity. Referring to FIG. 15, package 222 may be moved perpendicular to the longitudinal axes of chains 188 and 190, without any lateral motion, by driving chains 188 and 190 so that rollers 212 of chain 188 move at the same velocity as rollers 212 of chain 190, where the rollers are moving in opposite directions.

Figure 16:
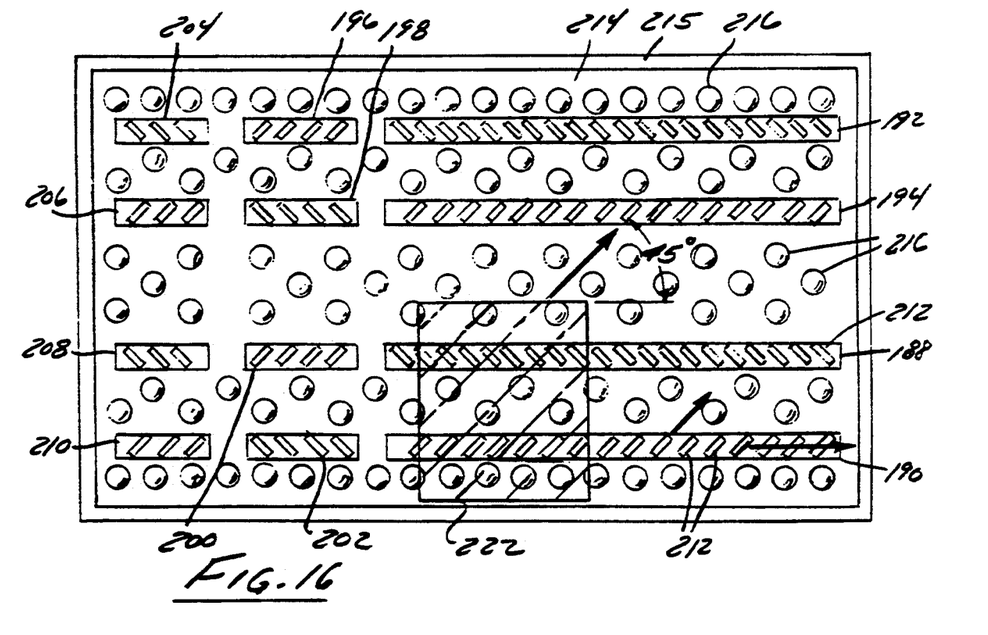
FIG. 16 is a top view of the cargo carrier including a package and representation of a fourth direction of movement for the package.

Referring to FIG. 16, package 222 may be moved to the right at a 45° angle to the longitudinal axes of chains 188 and 190 by holding chain 188 still and driving chain 190 so that rollers 212 move to the right. Alternatively, package 222 can be moved at a 225° angle to the left by driving rollers 212 of chain 190 to the left. To move package 222 at −45° to the right, chain 190 is held in place while rollers 212 of chain 188 are driven to the right. To move package 222 at a 135° angle to the left, chain 190 is held in place while rollers 212 of chain 188 are driven to the left.

In general, the combination and independent control of chains 188 and 190 allow package 222 to be moved in any direction. The direction depends upon the relative directions and speeds of chains 188 and 190. This direction of package 222 movement may be determined based upon the principle that rollers 212 transmit substantially 0 force in the direction perpendicular to their longitudinal axes 234 and transmit the maximum force along their longitudinal axes 234.

Figure 8:
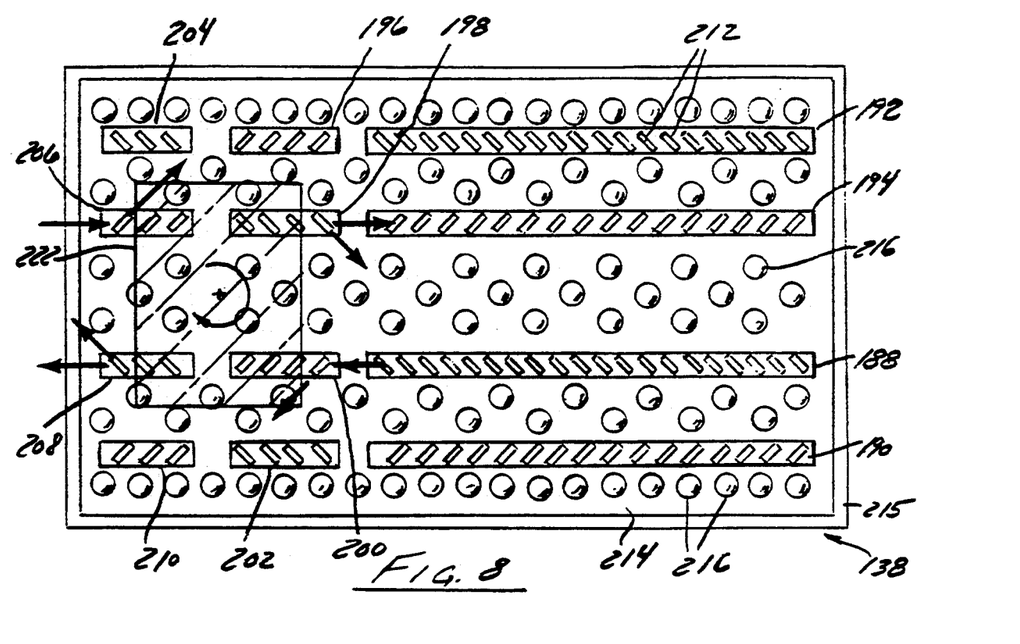
FIG. 8 is a top view of the cargo carrier including a package and representation of a direction of rotation for the package.
Figure 9:
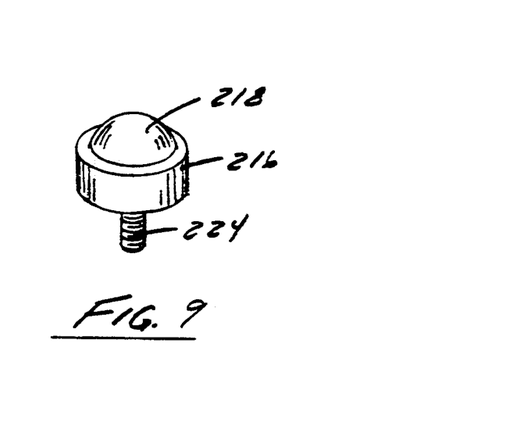
FIG. 9 is a perspective view of a spherical package supporting roller.

Referring to FIG. 8, a combination of four chains may be used to rotate package 222 as shown. More specifically, chains 198, 200, 208, and 206 are driven to rotate package 222 clockwise. Rollers 212 of chains 206 and 198 are driven to the right, and rollers 212 of chains 200 and 208 are driven to the left.

Referring back to FIG. 6, cargo conveyor 114 includes conveyor chains 240, 242, 244, 246, 248, 250, 252 and 254 which have the same configuration as chains 188 and 190 above. Chains 240-254 have chain guides and drives substantially the same as those described above, and are also operable to manipulate cargo as described above.

It will be understood that the foregoing description of the preferred exemplary embodiments do not limit the invention to the details of the structures shown. For example, various materials may be used for the chains and structural features of the cargo carrier and conveyors such as plastics and steels. By way of further modification, it may be desirable to apply power to the rear wheels in place of, or in addition to, driving the front wheels of the loader. Additionally, various features of the present invention may be used independently to achieve the advantage of the particular feature. For example, the particular scissors lift is not necessarily needed to obtain the advantage of the articulated vehicle, and it is not necessary to use an articulated vehicle with the scissors lift to obtain the advantages of the scissors lift. Additionally, the advantages of the cargo conveyor can be appreciated without associating the conveyor with a mobile loader.

Accordingly, modifications may be made to the disclosed cargo loader and associated conveyor which are contemplated as being within the scope of the invention as expressed in the appended claims.

What is claimed is:

1. A conveying apparatus for conveying an article in a chosen direction of a multitude of directions, in a substantially horizontal plane, comprising the following:

at least one chain;

a plurality of rollers with mounting means attached to said at least one chain;

the bottom surface of said article resting upon, and at least partially supported by, at least one of said rollers;

said mounting means including bearing means allowing for free rotation of said rollers;

said mounting means including bearing means allowing for free rotation of said rollers;

said rollers are attached to said at least one chain so that the axis of rotation of said rollers is at an acute angle with respect to the longitudinal direction of said at least one chain.

2. A conveying apparatus according to claim 1 wherein the conveyed article is at least partially supported by said rollers attached to a minimum of two said chains, one said chain having said rollers attached so that the acute angle is reversed relative to said rollers on the other said chain, whereby said article can be translated in the chosen direction by selective control of the direction and speed of said chains.

3. A conveying apparatus according to claim 1 wherein said article is at least partially supported by said rollers attached to a minimum of four said chains, whereby said article can not only be translated in a chosen direction, but also can be rotated about an axis normal to said substantially horizontal plane, either clockwise or counter clockwise, by the selective control of the direction and speed of said chains.

* * * * *